Patented June 11, 1929.

1,716,474

UNITED STATES PATENT OFFICE.

HERBERT A. WINKELMANN, OF AKRON, OHIO, ASSIGNOR TO THE B. F. GOODRICH COMPANY, OF NEW YORK, N. Y., A CORPORATION OF NEW YORK.

RUBBER COMPOSITION AND METHOD OF MAKING THE SAME.

No Drawing. Application filed June 1, 1925, Serial No. 34,166. Renewed November 8, 1928.

This invention relates to rubber compositions and has for an object to provide an improved method for producing inexpensive, heat-moldable materials made in substantial part from vulcanized scrap rubber. A further object is to provide compositions of matter resulting from the above mentioned method.

Numerous processes have been devised for utilizing with a greater or less degree of efficiency vulcanized scrap rubber, most of which depend upon the reclaiming or plasticizing of the cured rubber. It has also been proposed to treat comminuted vulcanized rubber with sulfonyl chlorides to produce therefrom a moldable, heat-plastic material. The purpose of the present application is to provide improved means for accomplishing the latter result, one which shall be more economical to carry out and which will produce more homogeneous and uniformly heat-plastic substances.

One of the disadvantages of the sulfonyl chloride reaction products of vulcanized rubber, or of mixtures of vulcanized rubber and crude rubber, has been that of high cost of manufacture. I have discovered that as high as 50 parts of pine tar may be added to vulcanized rubber mixtures before addition of the acid reagent without necessity for increasing the amount of the acid reagent and with the result that the product has improved physical properties, such as tensile strength, flexibility and remoldability.

The following recipe may be taken as an example of the product above described, the parts given being by weight:

Comminuted vulcanized scrap_____ 90
Crude rubber_____ 10
Pine tar_____ 50
p-toluene sulfonyl chloride_____ 15
Sulfuric acid _____ 2

The vulcanized scrap is worked into the crude rubber in a mixer or on a rubber mill and the pine tar added, the mixing action being continued until these ingredients are thoroughly admixed and acid reagents have been added and dispersed throughout the mix. The batch is now subjected to heat, as in an oven, for such time and at such temperature as to produce a pronounced exothermal temperature rise within the batch. Preferably the batch should be heated slowly to give the mass a gradual temperature rise to that point at which the vigorous exothermal reaction is effected. I have found that heating for 10 hours at 290° F. is well adapted to produce this result. After the subsidence of the exothermal action, the mass is permitted to cool and may be masticated and washed on a rubber mill, if desired, to remove excess acid or other water soluble impurities. It is then ready for use as a raw material for a wide variety of purposes.

It is to be understood that the relative proportions of the p-toluene sulfonyl chloride and the sulfuric acid may be varied, or p-toluene sulfonyl chloride alone may be employed, and that other organic sulfonyl chlorides may be employed in place of the p-toluene sulfonyl chloride above recited. Thus, benzene, naphthylene, p-phenol, and other sulfonyl chlorides have been found to give satisfactory results in the process of the present application.

The use of pine tar in a vulcanized rubber and crude rubber mixture makes possible the use of a cheaper acid reagent than has been heretofore available for the conversion of vulcanized rubbers into heat-plastic materials, namely, sulfuric acid alone, since the pine tar has an especial cooperative action with sulfuric acid in producing these heat-plastic products. The following recipe is illustrative:

Comminuted vulcanized scrap_____ 75
Crude rubber_____ 25
Pine tar_____ 40
Sulfuric acid (sp. gr. 1.84)_____ 8

Following the procedure of the previous example, the scrap and crude rubbers are mixed with the pine tar, the acid dispersed throughout the mixture, and the batch subjected to heat at 268° F. for 6 to 7 hours. Upon subsidence of the exothermal reaction and cooling, the product has the characteristic properties of remoldable, heat-plastic materials.

Products made in accord with the present invention soften at relatively low temperatures, as at about the boiling point of water, and are repeatedly remoldable without material deterioration of their heat plastic properties. They have specific gravities in the neighborhood of .980 to 1.005, are relatively stable under atmospheric conditions, but are attacked slowly by strong acids. They possess a high tensile and transverse strength and have a dielectric strength of the order of ebonite. They are consequently suitable for the manufacture of molded insulation, including radio parts. Good results have been obtained where these heat plastics have been used as binders in fiber-board compositions, and when compounded with suitable pigments, phonograph records made therefrom have given satisfactory results.

It will be understood that various modifications may be resorted to within the scope of this invention, and I do not, therefore, limit the present application to the specific percentages of acid reagent described, nor to any particular conditions of time and temperature for the reaction process, since it is obvious that such factors will vary according to the types of scrap rubber to be treated and according to the properties desired in the finished product.

I claim:

1. The method of utilizing vulcanized scrap rubber in the manufacture of heat-plastic materials which comprises intimately mixing comminuted scrap rubber, crude rubber and pine tar, and reacting on the resulting mixture with an acid reagent adapted to convert it into a heat-plastic material.

2. The method of utilizing vulcanized scrap rubber in the manufacture of heat-plastic materials which comprises causing an acid reagent consisting at least in part of sulfuric acid to react with a mixture of comminuted vulcanized rubber, crude rubber and pine tar under such conditions as to produce a vigorous exothermal reaction therein.

3. The method of utilizing vulcanized scrap rubber in the manufacture of heat-plastic materials which comprises causing an acid reagent consisting at least in part of p-toluene sulfonyl chloride to react with a mixture of comminuted vulcanized rubber, crude rubber and pine tar under such conditions as to produce a vigorous exothermal reaction therein.

4. The method of utilizing vulcanized scrap rubber in the manufacture of heat-plastic materials which comprises masticating comminuted vulcanized rubber in a minor portion of crude rubber and mixing therewith a substantial amount of pine tar, dispersing concentrated sulfuric acid throughout the admixture and heating the mass to the extent of causing a vigorous exothermal reaction therein.

5. A reaction product of an acid reagent consisting at least in part of an organic sulfonyl chloride with an admixture of comminuted vulcanized rubber, crude rubber and pine tar.

6. A reaction product of an acid reagent consisting at least in part of p-toluene sulfonyl chloride with an admixture of comminuted vulcanized rubber, crude rubber and pine tar.

7. A reaction product of an acid reagent consisting at least in part of sulfuric acid with an admixture of comminuted vulcanized rubber, crude rubber and pine tar.

In witness whereof I have hereunto set my hand this 9th day of May, 1925.

HERBERT A. WINKELMANN.